US00RE34541E

United States Patent [19]

Kreiger

[11] E Patent Number: Re. 34,541

[45] Reissued Date of Patent: Feb. 15, 1994

[54] METHOD OF OPERATING A GAS-INFRARED RADIATOR, AND THE GAS-INFRARED RADIATOR

[76] Inventor: Kurt Kreiger, Asternweg 47, D-4050 Mönchengladbach 2, Fed. Rep. of Germany

[21] Appl. No.: 741,763

[22] Filed: Aug. 7, 1991

Related U.S. Patent Documents

Reissue of:

[64] Patent No.: 4,861,261
Issued: Aug. 29, 1989
Appl. No.: 124,990
Filed: Oct. 5, 1987

[30] Foreign Application Priority Data

Feb. 5, 1986 [DE] Fed. Rep. of Germany ..... 3603387

[51] Int. Cl.[5] ..... F23C 11/04

[52] U.S. Cl. ..... 431/1; 431/328; 431/329

[58] Field of Search ..... 431/1, 328, 329

[56] References Cited

U.S. PATENT DOCUMENTS

| | | | |
|---|---|---|---|
| 3,091,224 | 5/1963 | Rydberg | 431/1 |
| 3,529,916 | 9/1970 | Krieger | 431/329 |
| 3,661,499 | 5/1972 | Krieger | 431/328 |
| 4,276,857 | 7/1981 | Martin | 431/1 |
| 4,416,618 | 11/1983 | Smith | 431/328 |
| 4,460,123 | 7/1984 | Beverly | 236/46 R |
| 4,515,554 | 5/1985 | Sirand | 431/328 |

FOREIGN PATENT DOCUMENTS

| | | |
|---|---|---|
| 136928 | 10/1985 | European Pat. Off. . |
| 1401165 | 10/1968 | Fed. Rep. of Germany . |
| 2042364 | 6/1971 | Fed. Rep. of Germany . |
| 1629952 | 2/1972 | Fed. Rep. of Germany . |
| 2545282 | 9/1979 | Fed. Rep. of Germany . |
| 29100 | 6/1964 | German Democratic Rep. . |
| 193021 | 11/1983 | Japan . |
| 1170041 | 11/1969 | United Kingdom . |
| 2076996 | 12/1981 | United Kingdom . |

*Primary Examiner*—Carroll B. Dority
*Attorney, Agent, or Firm*—Louis Weinstein

[57] ABSTRACT

In order to adapt a gas-infrared radiator (a radiant burner) to operating conditions in a particularly efficient manner, the energy delivered is reduced by intermittently reducing a controlled supply of gas so that the energy delivery is below about 40% or even less of the maximum energy delivery of the infrared radiator, and a flame supplied separately from the controlled gas supply is maintained in the combustion chamber of the gas-infrared radiator, at least when operating in the aforementioned range. This is achieved more particularly by providing at least one nozzle (22) for a pilot light, directed towards the combustion chamber (4).

14 Claims, 3 Drawing Sheets

METHOD OF OPERATING A GAS-INFRARED RADIATOR, AND THE GAS-INFRARED RADIATOR

Matter enclosed in heavy brackets [ ] appears in the original patent but forms no part of this reissue specification; matter printed in italics indicates the additions made by reissue.

TECHNICAL SECTOR

The invention relates to a method of operating a gas-infrared radiator and to a gas-infrared radiator of use more particularly in the method.

Gas-heated infrared radiators, also called radiant burners, are used inter alia in the treatment or processing of webs of material, particularly in the paper and cardboard industry. The treatment more particularly comprises heating the web material in the press part of board machines, drying the paper and cardboard and drying the coating on paper or cardboard.

STATE OF THE ART

Known infrared radiators (radiant burners) have a casing containing a pre-chamber supplied with a mixture of gas or fuel vapour with air, a combustion chamber separated from the pre-chamber by a barrier layer of heat-resistant material, and a hot member which externally covers the combustion chamber. The barrier layer is formed with through apertures for the mixture. In a particularly well-tried embodiment the hot member is made up of a number of individual quadrilateral parts held by a grid disposed in front of them (German patent specification 16 29 952).

In the case of drying plants for web material, infrared radiators are disposed in a number of rows one behind the other, each row extending across the entire width of the web. Each row consists of a corresponding number, of adjacent infrared radiators. The moisture content of a web for drying often varies across the web and may also vary along the web. The web is said to have a moisture profile, which can be mapped by measuring devices in front of the radiator system. Normally the object is to dry the web uniformly, and consequently the supply of heat to the web has to be varied from one region to another.

In the case of known installations this is done by regulating the gas supply to individual infrared radiators or groups thereof. To this end, a valve can be disposed in the gas feed pipe to each radiator and opened and closed in *a* preset manner by a control means.

Existing connectional means can reduce the energy delivery from one or more infrared radiators to only about 40% of the maximum energy delivery. Below this value, if the supply of gas per unit time is further reduced, the radiation burner cannot be kept in operation. Instead, if the fuel supply is excessively reduced, the burner goes out and has to be re-ignited. This is an unwelcome interuption, causes additional expense, and is also dangerous. On the other hand there is an urgent need to be able to turn down the energy delivered by a gas-infrared radiator to the maximum extent, in order to meet requirements in optimum manner.

DESCRIPTION OF THE INVENTION

The object of the invention is to overcome the existing disadvantages and difficulties and devise a method enabling the energy delivered by a gas-infrared radiator (radiant burner) to be adapated to requirements better than previously. The invention also aims to provide a gas-infrared radiator which operates reliably even when there are very wide fluctuations in the supply of gas or gas-air mixture and can therefore operate over a wide range. The invention also aims in detail to provide an advantageous embodiment of the gas-infrared radiator. Other associated problems dealt with by the invention will be clear from the explanation of the disclosed solution.

In the method according to the invention, in order to reduce the energy output of the infrared radiator. The amount of gas supplied is intermittently varied by a pulse control system down to a range corresponding to an energy delivery less than about 40% of the maximum energy delivery of the infrared radiator, the air supply being continuously maintained, and a flame supplied with gas is maintained in the combustion chamber separately from the controlled gas supply, at least when operating in the previously-mentioned range.

It is thus possible to operate a gas-infrared radiator reliably and continuously even when the energy delivery is greatly reduced, if required down to or near zero. Even when the supply of gas is temporarily cut off, the radiator immediately operates and delivers appropriate energy when the gas supply is renewed. The invention is particularly efficient at meeting requirements in individual cases, e.g. when drying a paper web, so that the desired result can be advantageously obtained even in the case of extreme moisture profiles.

The flame supplied with gas separately from the controlled fuel-gas supply can also be separately supplied with combustion air. However, this is normally unnecessary when an air supply to the combustion chamber is fully maintained, or to a reduced extent if necessary, during reduction of the energy delivery by reducing the supply of fuel gas, as is particularly advantageous.

The supply of fuel gas is controlled by a "pulse control system" which can be provided for one or a number of radiators. A pulse control system operates as follows: During a fixed preset interval, the opening times and closing times of a valve in the gas feed pipe alternate in *a* controlled manner.

The invention also relates to a gas-infrared radiator comprising a combustion chamber surrounded substantially on all sides by components and receiving the openings of individual feed pipes for *delivering* a gas-air mixture through a heat-resistant burner layer; according to the invention, the pulse control system is provided for reducing the supply of fuel gas and, in addition to the feed pipes to the combustion chamber, at least one nozzle or the like for a pilot flame directed into the combustion chamber is present with a separate gas feed pipe independent of a pulse-controlled supply of fuel gas. A burner of this kind is particularly suitable for use in the previously-described method *of the present invention*, but can also be advantageously used in other cases.

The mouth of the nozzle or the like for the pilot light can extend into the combustion chamber or can be set back relative to a boundary of the chamber.

In an advantageous embodiment the nozzle or the like for the pilot light is surrounded by a flow path for a medium. The medium can be pure combustion air, which if required can be supplied separately for the nozzle, or alternatively it can be air mixed with gas, more particularly from the prechamber disposed in front of the combustion chamber and separated there.

from by a heat-resistant barrier layer. The flow path is advantageously a duct extending through the barrier-layer.

Further details, features and advantages of the invention will be clear from the following description of embodiments, the associated drawings and the claims.

PREFERRED METHODS OF EMBODYING THE INVENTION

Figure 1:
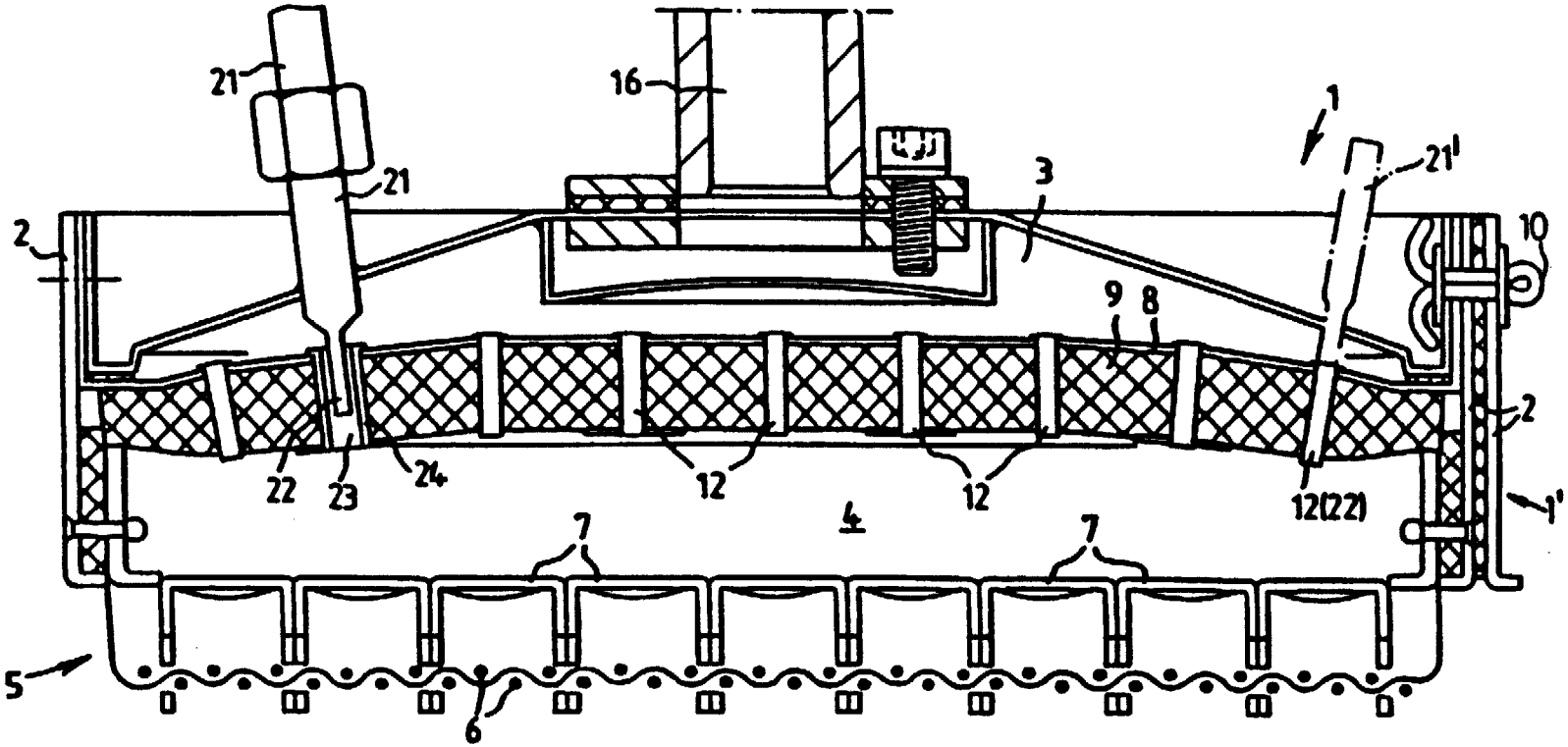
FIG. 1 is a vertical section through the middle of a gas-infrared radiator constructed according to the invention.

The illustrated gas-infrared radiator 1 has a substantially rectangular base shape and comprises a metal casing 2 insulated if squired, containing a prechamber 3, a combustion chamber 4 and a correspondingly rectangular burner head S. Head 5 has a wire grid 6 holding individual parts 7 of a hot member. Parts 7 have e.g. a basically square shape and are made of a high-quality alloy.

Prechamber 3 is separated from combustion chamber 4 by a border layer 9, inter alia a mat of ceramic fibres or other suitable material. Layer 9 is formed with supply pipes 12 for *supplying* the gas-air mixture, extending through from pre-chamber 3 to combustion chamber 4. Supply pipes 12 are advantageously in the form of metal tubes inserted in the barrier layer and secured e.g. to a metal plate 8 holding the barrier layer 9 and shutting off the pre-chamber 3.

Reference 10 denotes a split-pin or the like for joining the casings of two adjacent radiators *1 and 1'*, more particularly when the radiators are disposed in a row. *Only a portion of radiator 1' is shown for purposes of simplicity.*

One or more radiators in an aforementioned row can be equipped with one or more ignition and monitoring electrodes in known manner. Alternatively the radiator according to the invention can without difficulty be equipped with an ignition and/or monitoring electrode or corresponding devices.

The combustion process occurring in the combustion chamber heats the hot member, which gives out energy in the form of radiation, mainly infrared.

Figure 2:
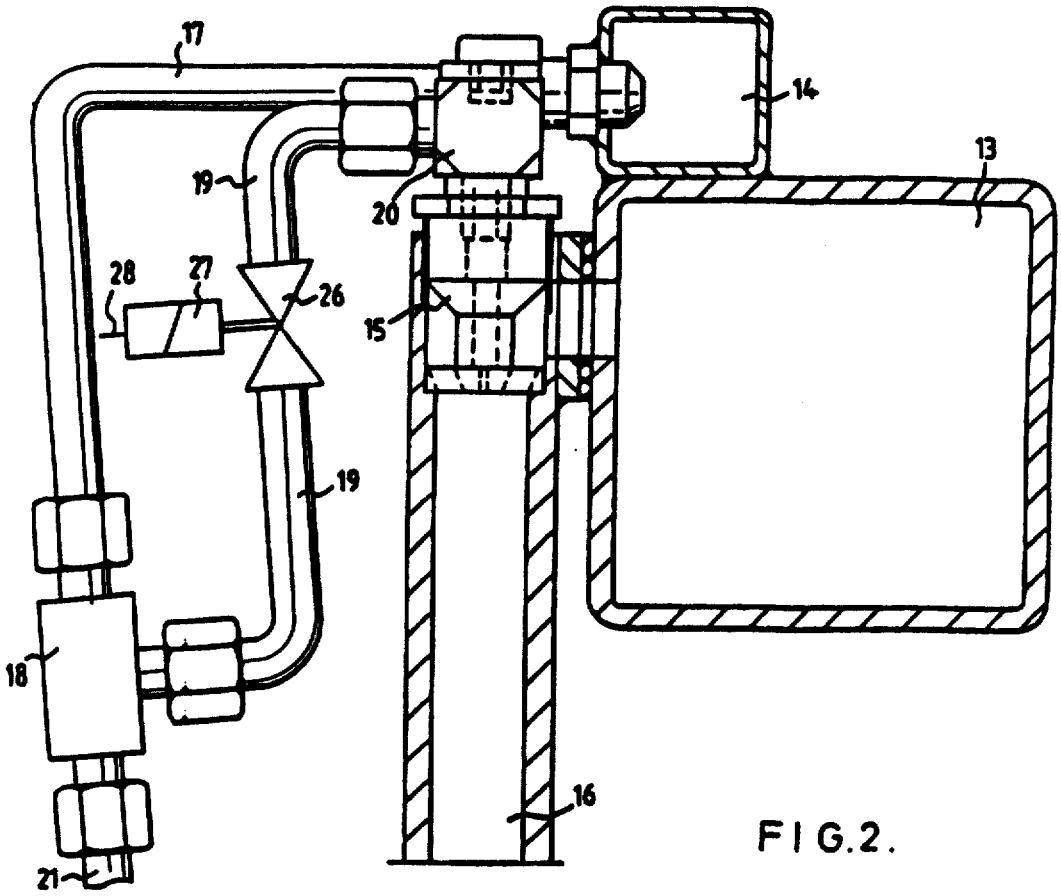
FIG. 2 shows an embodiment of the supply and control elements associated with the burner in FIG. 1. In the form of a diagram continuing FIG. 1 at the top.

Details of the fuel supply are shown in FIG. 2. Reference 13 denotes an air supply line and reference 14 a gas supply line. These lines can supply a [larger] *large* number of radiators or rows of radiators. Air and gas travel from lines 13 and 14 through a mixing nozzle 15 into a mixing chamber 16, the bottom end of which terminates in the prechamber 3 (compare FIG. 1).

In the embodiment shown, the air from line 13 constantly flows through nozzle 15 *and* chamber 16 to radiator 1, whereas the gas supply is controllable in a special manner.

Firstly, a gas tube 17 extends from line 14 to a branch member 18 from which a feed pipe 19 extends through a headpiece 20 to the mixing nozzle 15.

Pipe 19 contains a valve 26 actuated by a device 27, more particularly from a completely closed position into a completely opened position and vice versa. Device 27 is connected by a line 28 to a pulse control device (not shown) or a central unit thereof, which emits pulses controlling the device 27 and valve 26. Components 26 and 27 may more particularly be anelectromagnetically actuated valve.

The pulse control device (not shown in detail) associated with one or more radiators advantageously operates as follows: during *a* preset fixed time interval or cycle of e.g. 6 seconds, valve 26 is opened during a certain number of switching operations, each for a given time, the opening time being adjustable. The amount of fuel gas supplied per unit time can thus be altered in order to vary the energy delivered by radiator 1. The times during which valve 26 is opened and closed are always so short that compensation occurs owing to the inertia conditions in the adjacent system, the result being that the mixture reaching the combustion chamber always has the desired quality corresponding to the aimed-at energy delivery by the radiator.

Figure 3:
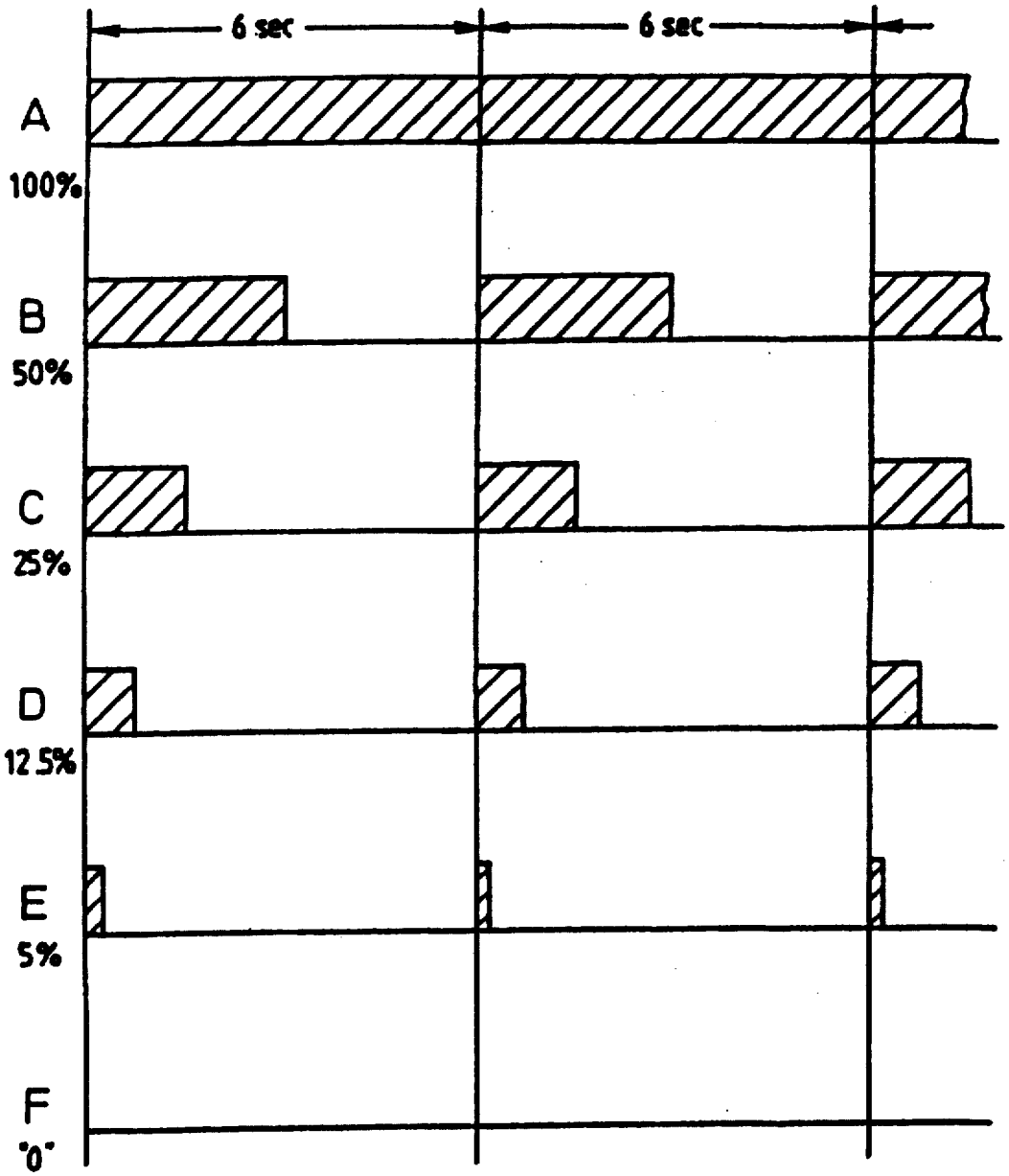
FIG. 3 is a diagram of the manner of operation of the pulse control system, illustrating its possibilities.

FIG. 3 is a diagram of various adjustable methods of operation in the case of the pulse-controlled gas feed pipe, and consequently with regard to the output of the burner. In each case the basis is a time interval or cycle of 6 seconds. The shaded areas indicate that valve 26 is opened and consequently gas flows to the mixing chamber 16, which is constantly connected to the air pipe 13. At other times, valve 26 is closed by the pulse control system, when air alone is supplied.

In the operating mode denoted by the letter A, the burner is operated at 100% output. In mode B, gas is supplied during only half each cycle, so that the burner operates at 50% capacity. Correspondingly, the other modes C, D and E represent outputs of 25%, 12.5% and an even lower value, e.g. 5%. Mode F corresponds to the burner being switched off.

A gas feed pipe 21 always [freely] *continuously* connected to the gas pipe 17 leads from [a] branch member 18 to a nozzle 22 directed towards the combustion chamber 4 or ending therein. The nozzle *22* therefore has a gas supply which is separate and independent of the aforementioned means controlling the amount of fuel gas supplied to the mixing nozzle 15 and mixing chamber 16 and then supplied with air to the radiator. Consequently a pilot light is continuously maintained in the combustion chamber 4, and its tip is directed more particularly towards a part 7 of the hot body.

As a result, and in *a* particularly advantageous manner the amount of fuel gag supplied in controlled manner by valve 26 (as previously explained inter alia in conjunction with FIG. 3) can be reduced to very small values, and the energy delivered by the radiator can be reduced as required without interrupting or disadvantageously influencing its operation. The pilot light is not an ignition flame or the like [the] igniting a known burner, but a flame which ensures that the radiator can operate in the described manner even at low power.

Nozzle 22 can project into the combustion chamber 4. In the embodiment shown, the mouth of nozzle 22 is *positioned* in a metal tube 24 extending through the barrier layer 9 and bounding an annular flow path 23 leading from the prechamber 3 to the combustion chamber 4. The pilot light from nozzle 22 thus receives combustion air from the prechamber through the flow path 23.

As a variant to the described embodiment, various other arrangements and embodiments are possible for a nozzle or the like for a pilot flame. For example one of the supply pipes 12 can be used as a nozzle for a pilot flame and connected to a separate gas supply, as shown chain-dotted at reference 21' in the right half of FIG. 1. The combustion air will then be the air supplied in any case *to* chamber 4.

The pilot-light nozzle can also be supplied beforehand with a gas-air mixture independently of the fuel gas supply.

All features mentioned in the preceding description or shown in the diagrams should be regarded as coming under the invention, either alone or in combinations, insofar as permitted by the known prior art.

What is claimed:

1. A method of operating a gas infrared radiator with variable energy output and comprising means forming a combustion chamber surrounded substantially on all sides by components and a pre-chamber adjacent the combustion chamber, a barrier layer of fibrous material with a plurality of pipes extending therethrough separating the pre-chamber from the combustion chamber, the amount of gas other than air supplied to the combustion chamber or said pre-chamber [chamber] being variable by a control device, characterized in that the amount of gas supplied is intermittently varied by a pulse control system down to a range corresponding to an energy [delivery] *level* less than about 40% of the maximum rated energy obtainable from the infrared radiator, the air supply being continuously maintained, and a flame supplied with gas is maintained in the combustion chamber separately from the controlled gas supply when operating in the previously-mentioned range.

2. A method according to claim 1, characterized in that said gas other than air is intermittently reduced to a range less than about 20% of said maximum rated energy.

3. A method according to claim 2, characterised in that the controlled gas supply is intermittently reduced to a range corresponding to practically zero energy delivery by the infrared radiator.

4. A method according to any of claims 1 to 3, characterised in that the flame separately supplied with gas is also separately supplied with combustion air.

5. A gas infrared radiator comprising a pre-chamber connected to gas and air supply pipes and a combustion chamber surrounded substantially on all sides by components, a plurality of individual pipes for supplying a gas-air mixture and extending between the pre-chamber and the combustion chamber through a heat-resistant gas permeable barrier layer, pulse control means for intermittently varying the supply of fuel gas, at least one nozzle for a pilot light directed into the combustion chamber, and means providing a separate gas supply to said nozzle independent of the means for varying the supply of fuel gas.

6. A radiator according to claim 5, characterized in that the nozzle is surrounded by means forming a flow path for air or an air-containing medium.

7. A radiator according to claim 6 wherein said pre-chamber is supplied with [a] *said* gas-air mixture from a mixing-chamber and separated from the combustion chamber by the aforementioned heat-resistant barrier layer, characterised in that the flow path is a duct extending throughout the barrier layer.

8. A gas infrared radiator, comprising:

*a* pre-chamber connectable to gas and air supply pipes;

a combustion chamber surrounded substantially on all sides by components;

a heat resistant, gas permeable barrier layer disposed between the pre-chamber and said combustion chamber;

a plurality of individual conduits for supplying a gas and air mixture from the pre-chamber into the combustion chamber through said heat resistant barrier layer;

pulse control means for supplying and intermittently varying the supply of fuel gas to said pre-chamber;

at least one nozzle for a pilot light directed into the combustion chamber through said barrier layer, said nozzle being surrounded by means forming a flow path of said mixture into said combustion chamber; and means providing a separate gas supply to said nozzle independently of the means for varying the supply of fuel gas.

*9. A method of operating a gas infrared radiator to provide a variable energy output and comprising means forming a combustion chamber and pre-chamber, a barrier layer arranged between said pre-chamber and said combustion chamber, said barrier layer having a plurality of pipes extending through said barrier layer for communicating said pre-chamber with said combustion chamber, the amount of a gas other than air supplied to the combustion chamber or said pre-chamber being variable by a control device, characterized in that the amount of gas supplied is intermittently varied by a pulse control system to regulate the output energy of the infrared radiator over a range extending from the maximum rated energy level capable of being delivered by the infrared radiator to an energy level less than about 40% of said maximum rated energy level, the air supply to said mixing chamber being continuously maintained and a pilot flame in said combustion chamber being maintained by gas supplied to the combustion chamber separately from the controlled gas supply to assure combustion within said combustion chamber whenever gas is delivered to the combustion chamber from said pre-chamber.*

*10. The method of claim 9 being further characterized in that said gas other than air is intermittently varied so that the energy level at the lower end of the range is less than about 20% of said maximum rated energy.*

*11. The method of claim 9 being further characterized in that said gas other than air is intermittently controlled so that the energy level at the lower end of the range is practically at the zero energy level.*

*12. The method of claim 9, being further characterized in that the pilot flame separately supplied with gas is also separately supplied with combustion air.*

*13. A gas infrared radiator comprising:*

*a pre-chamber connectable to gas and air supply sources;*

*a combustion chamber;*

*a heat resistant barrier layer disposed between said pre-chamber and said combustion chamber;*

*said barrier layer having a plurality of individual conduits for supplying a gas and air mixture from said pre-chamber into said combustion chamber through each of said conduits;*

*pulse control means for supplying and intermittently varying the supply of fuel gas to said pre-chamber;*

*at least one nozzle for a pilot flame extending through said barrier layer and directed into the combustion chamber; and*

*means providing a separate gas supply to said nozzle independently of said pulse control means for supplying fuel gas to said pilot flame nozzle unaffected by said pulse control means.*

*14. A gas infrared radiator according to claim 13 wherein said separate gas supply includes means for continuously supplying gas for said pilot flame totally unaffected by the intermittent operation of said pulse control means.*

* * * * *

UNITED STATES PATENT AND TRADEMARK OFFICE

CERTIFICATE OF CORRECTION

PATENT NO. : Re. 34,541

DATED : February 15, 1994

INVENTOR(S) : Kurt Kreiger

It is certified that error appears in the above-indentified patent and that said Letters Patent is hereby corrected as shown below:

Column 1, line 19 after "web" insert --of--.

Column 1, line 53 change "connectional" to --conventional--.

Column 1, line 60 change "interuption" to --interruption--.

Column 2, line 67 change "there." to --there- --.

Column 3, line 15 change "Fig. 1. In" to --Fig. 1, in--.

Column 3, line 25 change "squired" to --required--.

Column 3, line 27 change "head S" to --head 5--.

Column 3, line 32 change "border" to --barrier--.

Column 4, lines 4 and 5 change "anelectromagnetically" to --an electromagnetically--.

Column 4, line 49 change "gag" to --gas--.

UNITED STATES PATENT AND TRADEMARK OFFICE

CERTIFICATE OF CORRECTION

PATENT NO. : Re.34,541

DATED : February 15, 1994

INVENTOR(S) : Kurt Kreiger

It is certified that error appears in the above-indentified patent and that said Letters Patent is hereby corrected as shown below:

Column 4, lines 4 and 5 change "anelectromagnetically" to --an electromagenetically --.

Coluymn 4, line 49, change "gag" to --gas --.

Signed and Sealed this

Eighteenth Day of October, 1994

*Attest:*

Bruce Lehman

BRUCE LEHMAN

*Attesting Officer*

*Commissioner of Patents and Trademarks*